(12) United States Patent
Dai et al.

(10) Patent No.: US 11,436,818 B2
(45) Date of Patent: Sep. 6, 2022

(54) INTERACTIVE METHOD AND INTERACTIVE SYSTEM

(71) Applicant: Guangdong Virtual Reality Technology Co., Ltd., Shenzhen (CN)

(72) Inventors: Jingwen Dai, Shenzhen (CN); Jie He, Shenzhen (CN)

(73) Assignee: Guangdong Virtual Reality Technology Co., Ltd., Shenzhen (CN)

( * ) Notice: Subject to any disclaimer, the term of this patent is extended or adjusted under 35 U.S.C. 154(b) by 461 days.

(21) Appl. No.: 16/596,789

(22) Filed: Oct. 9, 2019

(65) Prior Publication Data

US 2020/0042821 A1 Feb. 6, 2020

Related U.S. Application Data

(63) Continuation of application No. PCT/CN2017/096302, filed on Aug. 7, 2017.

(30) Foreign Application Priority Data

Apr. 28, 2017 (CN) .......................... 201710294577.1

(51) Int. Cl.
*G06V 10/46* (2022.01)
*G06T 7/00* (2017.01)
(Continued)

(52) U.S. Cl.
CPC ............ *G06V 10/462* (2022.01); *G06F 3/011* (2013.01); *G06F 3/017* (2013.01); *G06T 7/20* (2013.01);
(Continued)

(58) Field of Classification Search
CPC .......... G06T 7/97; G06T 7/20; G06T 19/006; G06V 10/462; G06F 3/011; G06F 3/017; G02B 27/017
See application file for complete search history.

(56) References Cited

U.S. PATENT DOCUMENTS

| | | | | |
|---|---|---|---|---|
| 4,808,064 | A | * | 2/1989 | Bartholet ............... G05B 19/39 414/730 |
| 9,841,753 | B2 | * | 12/2017 | Fontanot ............ G05B 19/4183 |

(Continued)

FOREIGN PATENT DOCUMENTS

| | | | | |
|---|---|---|---|---|
| CN | 101579964 B | * | 5/2009 | ............. B41F 33/02 |
| CN | 104699247 X | | 11/2012 | |

(Continued)

OTHER PUBLICATIONS

International Search Report (PCT/CN2017/096302); dated Jan. 31, 2018.

*Primary Examiner* — Ryan R Yang
(74) *Attorney, Agent, or Firm* — W&G Law Group

(57) ABSTRACT

A tracking method, comprising: acquiring a feature point of a controller by a camera of a HMD, wherein the feature point is used to indicate a corresponding location of the controller; receiving state information of the controller collected by an IMU of the controller, wherein the state information includes position information and rotation information of the controller; and determining a current state of the controller according to the feature point and the state information, wherein the current state includes a current position and a current rotation of the controller.

16 Claims, 2 Drawing Sheets

(51) Int. Cl.
*G06F 3/01* (2006.01)
*G06T 7/20* (2017.01)
*G06T 19/00* (2011.01)
*G02B 27/01* (2006.01)

(52) U.S. Cl.
CPC .............. *G06T 7/97* (2017.01); *G06T 19/006* (2013.01); *G02B 27/017* (2013.01)

(56) References Cited

U.S. PATENT DOCUMENTS

2005/0206874 A1    9/2005  Dougherty
2013/0058569 A1*   3/2013  Kawano ............. H04N 1/40075
                                              382/165
2014/0333773 A1   11/2014  Davis et al.
2015/0070498 A1*   3/2015  Kriel ........................ B60R 1/00
                                              348/148
2016/0314621 A1*  10/2016  Hill ....................... G06T 19/006

FOREIGN PATENT DOCUMENTS

CN        105913364 A      8/2016
CN        106249905 A     12/2016
EP         3158417 B1 *    1/2016    .............. G06F 3/00

* cited by examiner

INTERACTIVE METHOD AND INTERACTIVE SYSTEM

CROSS-REFERENCE TO RELATED APPLICATIONS

This application is a continuation application of International Application No. PCT/CN2017/096302, filed on Aug. 7, 2017, which claims priority to Chinese Patent Application No. 201710294577.1, filed on Apr. 28, 2017. The disclosures of the aforementioned patent applications are hereby incorporated by reference in their entireties.

TECHNICAL FIELD

The present disclosure relates to the field of virtual reality, augmented reality, mixed reality, and in particular, to an interactive method and system.

BACKGROUND

In a two-dimensional screen interaction, almost all control commands can be abstracted into keystrokes. In the field of visual enhancement technology, such as Virtual Reality (VR) which is based on pure virtual interface to simulate reality, Augmented Reality (AR) and Mixed Reality (MR) which is based on the combination of real content and virtual content, natural interaction is the key point of visual enhancement technology, how to realize interaction with the virtual world with high immersion, high efficiency, and low cost is important. Input interaction is very important in the field of visual enhancement technology, the user can interact with the environment and objects in the virtual world by capturing user's actions, such as the head, hands, and even the whole body, to increase the user's immersion, which can expand more applications.

For example, in the VR field, a Six degrees of freedom (6-DoF) head tracking and controller tracking, such as the Oculus Rift headset with Oclulus Touch Controller, the HTC Vive headset with a Lighthouse tracker, the Sony PS headset with a PS Camera sensor and a PS Move controller, is standard on a personal computer (PC) or a host computer. For mobile headset, such as the Google Cardboard headset, Samsung Gear headset or Similar VR boxes, it lacks input interactive devices, only a few mobile headsets are equipped with controllers, such as Google Daydream's Daydream controller with three degree of freedom (3DoF).

However, for the mobile terminal, without the tracking system, or with the 3-DoF tracking system, the interaction are inaccurate and complicated, which reduces immersion and ease of use; while the PC with the 6DoF tracking system requires an external device to cooperate, which is inconvenient to use in the mobile scene, at the same time, there is no system that can simultaneously be compatible with 6DoF head position tracking and 6DoF controller tracking.

SUMMARY OF THE DISCLOSURE

According to one aspect of the present disclosure, a tracking method is provided. The method comprising: acquiring a feature point of a controller by a camera of a head-mounted display (HMD), wherein the feature point is used to indicate a corresponding location of the controller; receiving state information of the controller collected by an inertial measurement unit (IMU) of the controller, wherein the state information includes position information and rotation information of the controller; and determining a current state of the controller according to the feature point and the state information, wherein the current state includes a current position and a current rotation of the controller.

According to another aspect of the present disclosure, a tracking system is provided. The system includes a HMD and at least one controller. The HMD comprises: a camera, configured to capture a feature point of the controller, wherein the feature point is used to indicate a corresponding location of the controller; a transceiver, configured to receive state information collected by an IMU of the controller; and a processor, configured to determine a current state of the controller according to the feature point and the state information, wherein the current state includes a current position and a current rotation of the controller. The controller comprises: a light spot, configured for representing the feature point on an image captured by the camera; an IMU, configured to collect the state information including position information and rotation information of the controller; and a transceiver processing unit, configured to send the state information to the HMD.

According to yet another aspect of the present disclosure, a HMD is provided. The HMD comprising: a camera, configured to capture a feature point of the controller, wherein the feature point is used to indicate a corresponding location of the controller; a transceiver, configured to receive state information collected by an IMU of the controller, wherein the state information includes position information and rotation information of the controller; and a processor, configured to determine a current state of the controller according to the feature point and the state information, wherein the current state includes a current position and a current rotation of the controller.

BRIEF DESCRIPTION OF THE DRAWINGS

In order to make the technical solution described in the embodiments of the present disclosure more clearly, the drawings used for the description of the embodiments will be briefly described. Apparently, the drawings described below are only for illustration but not for limitation. It should be understood that, one skilled in the art may acquire other drawings based on these drawings, without making any inventive work.

DETAILED DESCRIPTION

Figure 1:
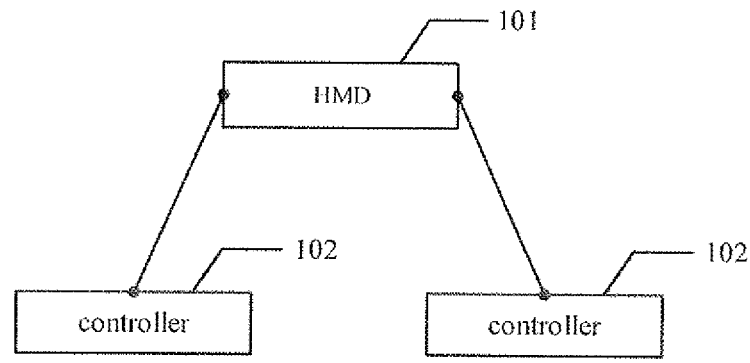
FIG. 1 is a schematic diagram of an interactive system, according to an embodiment of the present disclosure.

Embodiments of the present disclosure provide data processing method and device for improving the accuracy of the system time difference between time systems in the time synchronization system.

The technical solutions in the embodiments of the present disclosure are described in conjunction with the drawings in the embodiments of the present disclosure. It is obvious that the described embodiments are only a part of the embodiments of the present disclosure, and not all embodiments. All other embodiments obtained by the ordinary skilled in the art based on the embodiments in the present disclosure without the creative work are all within the scope of the present disclosure. It should be noted that similar reference numerals and letters indicate similar items in the following figures. Therefore, once an item is defined in a drawing, it is not necessary to further define and explain it in the subsequent drawings. Also, in the description of the present disclosure, the terms "first", "second", "third", and the like are used merely to distinguish a description, and are not to be construed as indicating or implying a relative importance.

In the field of visual enhancement technology, the interactive system may include a head mounted display (HMD) and controllers. This HMD can project an optical signal to user's eyes, to achieve visual effects, such as VR, AR, and MR. An interactive mode is a motion tracking mode recognizing and tracking feature points in an image captured by a camera, to identify the position of the controller. The feature point, such as an illuminant, is a feature that is clearly distinguishable from the other parts of the image captured by the camera. The motion tracking mode has different ways of setting the camera and the illuminant according to the position of the camera sensor. One is an Outside-In mode, which is to set the camera outside of the HMD, and set the illuminant on a human body or the HMD. Another is an Inside-Out mode, which is to set the camera on the HMD to sense the external environment, and set the illuminant on a carrier that needs to be tracked. The Outside-In mode is mostly used on the PC which is relatively fixed in the use environment, and is not suitable for the mobile terminal that is not fixed in the environment. For the mobile terminal, the Inside-Out mode is more feasible.

Referring to FIG. 1, an interactive system is provided according to the present disclosure. In this embodiment, an Inside-Out mode is used to track controller. The system may include a HMD 101 and at least one controller 102. Motion of the controller 102 can be tracked by the HMD 101 when the HMD is interacted with the controller 102. Motion of the HMD 101 can be tracked by the motion sensor and the camera of the HMD 101. In an example, the system may include two controllers 102 and a HMD 101, user can hold the two controllers 102 with two hands respectively. The HMD 101 and the controllers 102 in the above system are respectively described below.

Figure 2:
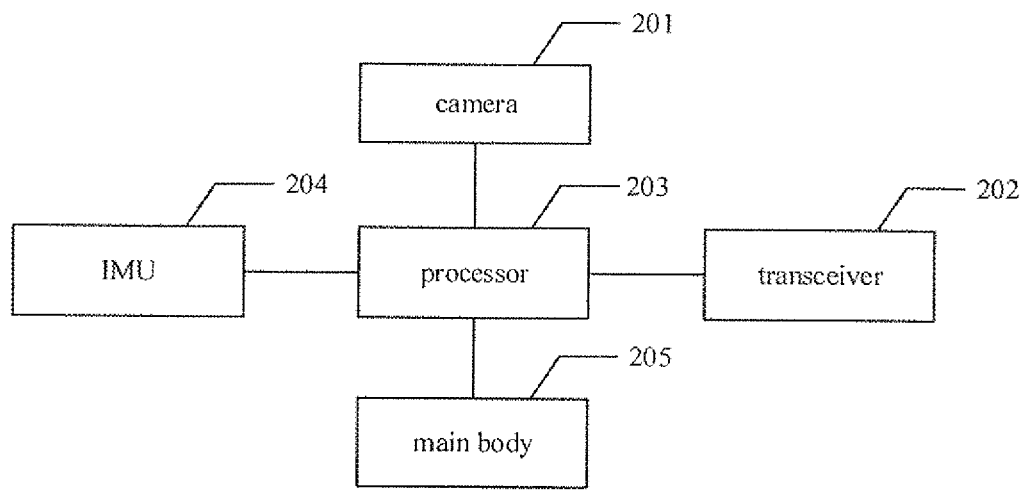
FIG. 2 is a schematic diagram of a head mounted display, according to an embodiment of the present disclosure.

Referring to FIG. 2, a HMD is provided according to an embodiment of the present disclosure. The HMD may include a main body 205, and a camera 201, a transceiver 202, a processor 203 and an IMU 204 disposed on the main body 205. The camera 201, the transceiver 202 and the IMU 204 are all connected to the processor 203.

The camera 201 is configured to capture a feature point for indicating a corresponding position of the controller, such as a light spot, the light spot may be Light-emitting diodes disposed on the controller 102. The camera can be a color image sensor, or a black and white image sensor. If the camera 201 is a color image sensor, the color of the light spots disposed on the different controllers 102 are different, the camera 201 can directly capture the color image, and the color image can be segmented into candidate regions by the processor 203, according to the color of the light spot, to segment the candidate region. If the camera 201 is a black and white image sensor, the candidate regions can be segmented according to a binary segmentation method.

It can be understood that, in the process of acquiring feature points, due to normal exposure of the global shutter image sensor, many interference points in the background may be detected, these interference points may affect the judgment of the controller tracking, and need to be removed. For example, when a binocular camera is used, the process may include obtaining the left and right images of the binocular camera, dividing the images according to the above processing manner of the color image sensor or the black and white image sensor, and searching connected areas to obtain a candidate region to remove the interference points of the non-candidate area.

In some embodiments, some constraints can be added to remove the interference points on the above method of removing the interference points.

In an example, a depth constraint may be added. When user holds the controller 102, the distance between the LED spot and the binocular camera does not exceed the length of the user's arm, the length value can be preset, for example, the length value is set to 1 meter, spots to the camera exceeding 1 meter can be regarded as an interference point.

In another example, a motion constraint may be added. Since the user's speed is limited when the user holds controller 102 to interact, the range of variation of the position of previous frame to the current frame is limited, if the spot out of the range, it can be considered as the interference. In addition, since the user is in motion, if position of a spot is unchanged in continuous frames, the spot can be regarded as an interference point.

In another example, an epipolar constraint may be added. The candidate point in the acquired left and right images need to meet the match on the epipolar, otherwise it can be considered as an interference point. A point a projects a1 on plane x1, and projects a2 on plane x2. A plane composed of point a, point a1 and point a2 intersects with the plane x1 with line b1, and intersects with the plane x2 with line b2. The line b1 is an epipolar corresponding to point a2, the line b2 is an epipolar corresponding to point a1. The epipolar constraint is that point a2 must be located on line b2, if point a and point a1 are known.

In another example, a shape constraint may be added. The light spot may be sphere or some special shape, and the light spot in the image can be the corresponding shape, it can be considered as an interference point if the shape of the candidate point does not match.

In another example, a size constraint may be added. When user holds the controller with the light spot, and moves in a limited area of the field of view of the camera, the imaging area is within a range. It can be considered as an interference point, whether it is too large or too small, if the connected area is not within the range of the imaging area.

The state information of the controller may be collected by the IMU including at least one of a gyroscope, an accelerometer, and a magnetometer, the IMU can detect six degree of freedom information, such as position and rotation. Specifically, movement trend of the controller can be determined by detecting the difference between the position and rotation of each frame.

The transceiver 202 is configured to receive state information of the controller 102 collected by an IMU of the controller 102. The transceiver 202 has the same transmission protocol as the controller 102. If the controller 102 adopts Bluetooth mode or 2.4G wireless connection mode, the transceiver 202 may also adopts the Bluetooth mode or 2.4G wireless connection mode.

In addition, prior to receiving the state information of the controller, time and space coordinate synchronization may also be required. Specifically, an IMU is provided on the controller 102, and a camera is provided on the HMD, prior to performing the work of the two devices, it is necessary to synchronize the time and coordinates between the IMU of the controller 102 and the camera sensor of the HMD, these two synchronizations are the basis for controller tracking.

The processor 203 determines a current state of the controller based on the feature point and the state information.

The method to determine the current state of the controller by the processor may include: identifying and processing the feature points captured by the camera, to obtain a first position of the controller; correcting the first position with a second position detected by the IMU of the controller, to obtain an accurate current position of the controller; and determining the current state of the controller according to rotation information of controller and the accurate current position.

In addition to tracking the motion of the controller 102, the HMD may also track the HMD itself. In this case, the camera 201 can be a binocular camera. The processor 203 is further configured to determine first state information of the HMD according to the external environment image captured by the camera 201. The IMU 204 can be configured to collect second state information of the HMD, the second state information can include position and rotation. The current state of the HMD can be determined by combining the first state information and the second state information collected by the IMU of the HMD.

The camera 201 may capture at least two external environment images at different moments, such as a previous frame of the external environment image and a current frame of the external environment image. The processor 203 determines the first state information of the HMD according to the at least two captured external environment images of different moments. Specifically, the processor 203 compares the external environment images at two moments, calculates the motion direction and position of the HMD in duration of one frame base on the external environment, and then calculates the position and rotation of the HMD. While calculating the position and rotation via the external image, the IMU 204 of the HMD may also collect the second state information, which also includes the position and rotation of the HMD. The processor 203 may corrects and compares the position and rotation in two different manners, and determines the current state of the HMD.

It should be noted that, prior to calculating and determining the first state information and the second state information of the HMD, time and space coordinate synchronization may also be required. Specifically, synchronizing the time and coordinates of the IMU 204 and the camera 201, which are the basis for subsequent motion tracking.

Figure 3:
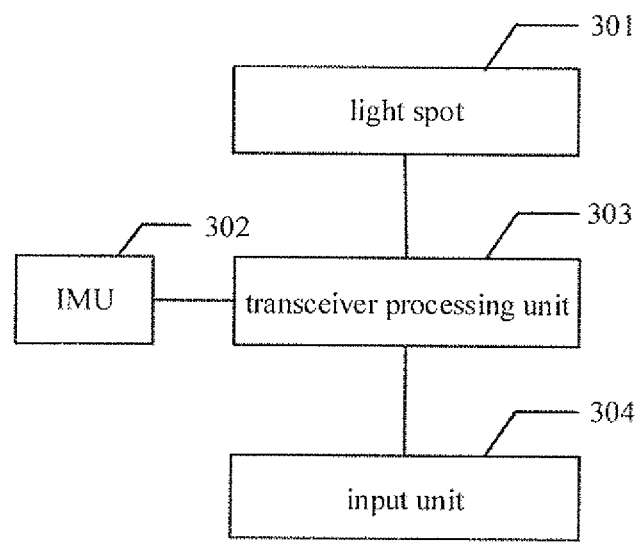
FIG. 3 is a schematic diagram of a controller, according to an embodiment of the present disclosure.

Referring to FIG. 3, a controller is provided according to an embodiment of the present disclosure. The controller may include a light spot 301, an IMU 302, a transceiver processing unit 303 and input unit 304. The light spot 301 may be a dot, a spherical shape, or other special shape, such as a ring, a square, a rectangular parallelepiped. The light spot 301 may be fixed at front end, middle portion, or end of the controller, as long as it can be detected by the camera of the HMD. The IMU 302 is configured to collect state information including position and rotation, and the process of collecting information can refer to the description or the IMU 204, which is not described herein. The transceiver processing unit 303 is configured to send the collected state information to the HMD, wherein the light spot 301 and the IMU 302 are both connected to the transceiver processing unit 303. The transceiver processing unit 303 can be divided into a transceiver unit and a processing unit, the two units may be coexisting on one chip, or two chips respectively. In some embodiments, the controller may include an input unit 304, instructions of the input unit 304 can be identified and sent to the HMD by the transceiver processing unit 303. The input unit 304 may include a touch pad, a button, a trigger, and the like.

Interaction method is described below according to an embodiment of the present disclosure.

Figure 4:
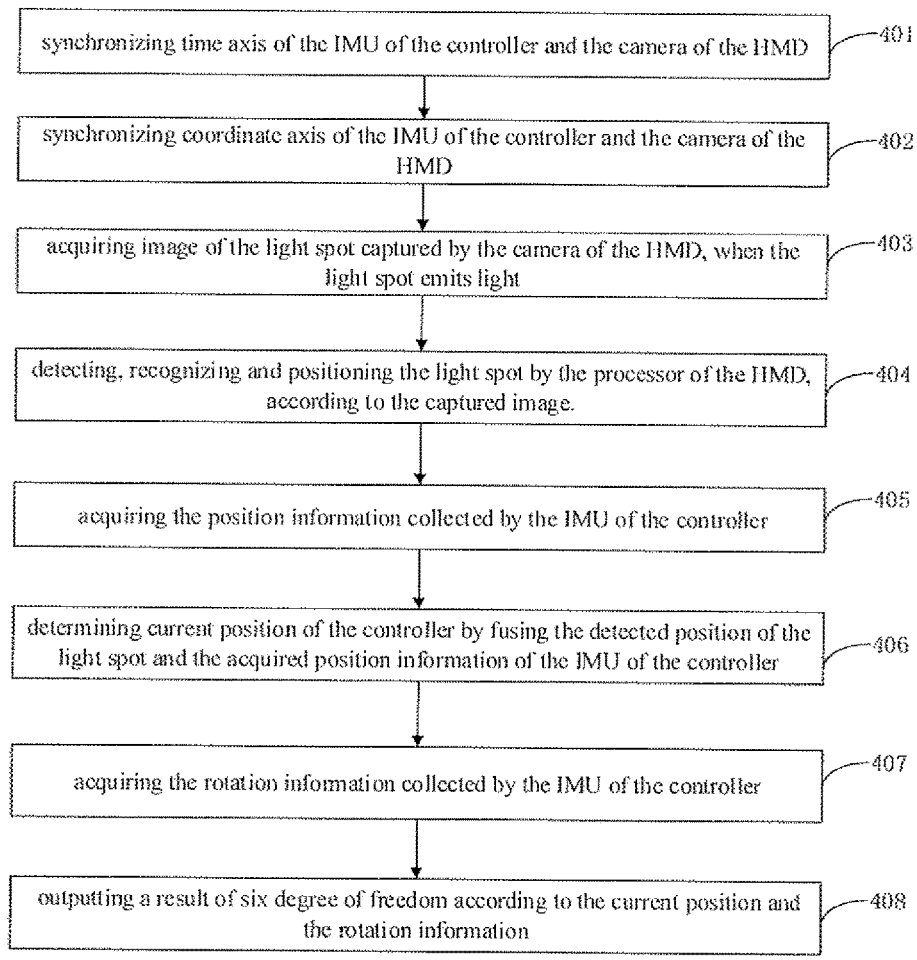
FIG. 4 is a schematic diagram of an interactive method, according to an embodiment of the present disclosure.

Referring to FIG. 4, an interaction method for tracking process of the controller is shown according to an embodiment of the present disclosure. The method, performed by the HMD, may include actions/operations in the following blocks.

At block 401, synchronizing time axis of the IMU of the controller and the camera of the HMD.

At block 402, synchronizing coordinate axis of the IMU of the controller and the camera.

Since tracking the controller requires the position information respectively collected by the HMD and the controller, it is necessary to perform time synchronization to ensure the position information respectively collected by the HMD and the controller at the same time.

At block 403, acquiring image of the light spot captured by the camera of the HMD, when the light spot emits light.

If the camera is a binocular camera, each set of images includes a left image and a right image.

At block 404, detecting, recognizing and positioning the light spot by the processor of the HMD, according to the captured image.

At block 405, acquiring the position information collected by the IMU of the controller.

The IMU is located in the controller, the controller uses the IMU to collect the position information of the controller, and sends the position information to the processor.

At block 406, determining current position of the controller by fusing the detected position of the light spot and the acquired position information of the IMU of the controller.

Specifically, the processor determines the position of the light spot according to the collected light spot, and fuses position information collected by the IMU sent from the controller and the position of the light spot.

At block 407, acquiring the rotation information collected by the IMU of the controller.

The position information and the rotation information may be sent to the processor at different times, or at the same time. The rotation state of the controller can be determined by the rotation information, collected by the IMU of the controller, sent from the controller.

At the block 408, outputting a result of six degree of freedom according to the current position and the rotation information.

Figure 5:
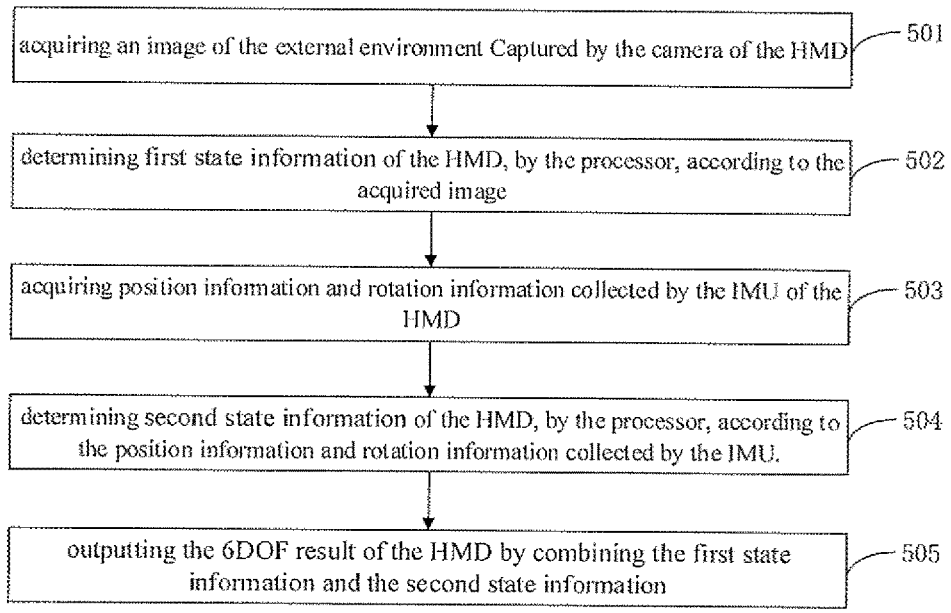
FIG. 5 is a schematic diagram of an interactive method, according to an embodiment of the present disclosure.

Referring to FIG. 5, an interaction method for tracking process of the HMD is shown according to an embodiment of the present disclosure. The method, performed by the HMD, includes actions/operations in the following blocks.

At block 501, acquiring an image of the external environment captured by the camera of the HMD.

At block 502, determining first state information of the HMD, by the processor, according to the acquired image.

At block 503, acquiring position information and rotation information collected by the IMU of the HMD.

At block 504, determining second state information of the HMD, by the processor, according to the position information and rotation information collected by the IMU.

At block 505, outputting the 6DOF result of the HMD by combining the first state information and the second state information.

Since the HMD adopts the internal camera to collect the feature point of the controller, and combines the position information and the rotation information collected by the IMU of the controller to determine the current state of the controller, thereby implementing 6-DoF tracking of the controller. For the HMD, collecting the position information and rotation information by the IMU of the HMD, and determining the current position of the HMD by the external image captured by the internal camera, thereby implementing the 6-DoF tracking of the HMD. Without affecting the portability of the visual enhancement device, the present disclosure improves interactive performance of the visual enhancement scene, and improves immersion and ease of use.

In above implementations, it may be implemented in whole or in part by software, hardware, firmware, or any combination thereof. When implemented in software, it may be implemented in whole or in part in the form of a computer program product.

The computer program product includes one or more computer instructions. When the computer program instructions are loaded and executed on a computer, the processes or functions described in accordance with embodiments of the present disclosure are generated in whole or in part. The computer can be a general purpose computer, a special purpose computer, a computer network, or other programmable device. The computer instructions can be stored in a computer readable storage medium or transferred from one computer readable storage medium to another computer readable storage medium, for example, the computer instructions can be transmitted from a website site, computer, server or data center to another website site, computer, server, or data center by wire (eg, coaxial cable, fiber optic, digital subscriber line) or wireless (eg, infrared, wireless, microwave). The computer readable storage medium can be any available media that can be stored by a computer or a data storage device such as a server, data center, or the like that includes one or more available media. The usable medium may be a magnetic medium (eg, a floppy disk, a hard disk, a magnetic tape), an optical medium (eg, a DVD), or a semiconductor medium (such as a solid state disk).

A person skilled in the art can clearly understand that, for the convenience and brevity of the description, the specific working process of the system, the device and the unit described above can refer to the corresponding process in the foregoing method embodiment, which is not described herein again.

It should be understood that, in the several embodiments provided by the present disclosure, the disclosed system, apparatus, and method may be implemented in other manners. For example, the embodiments of device described above are merely illustrative, the division of the unit is only a logical function division. There may be another division manner in actual implementation, for example, multiple units or components may be combined or integrated into another system, or some features can be ignored or not executed. In addition, the mutual coupling, direct coupling or communication connection shown or discussed may be an indirect coupling or communication connection through some interface, device or unit, and may be in an electrical, mechanical or other form.

The units described as separate components may be or may not be physically separated, and the components displayed as units may be or may not be physical units, that is, may be located in one place, or may be distributed to multiple network units. Some or all of the units may be selected according to actual needs to achieve the purpose of the solution of the embodiment.

In addition, each functional unit in each embodiment of the present disclosure may be integrated in one processing unit, or each unit may exist physically separately, or two or more units may be integrated in one unit. Above integrated unit can be implemented in the form of hardware or in the form of a software functional unit.

The integrated unit, if implemented in the form of a software functional unit and sold or used as a standalone product, may be stored in a computer readable storage medium. Based on such understanding, the technical solution of the present disclosure, which is essential or contributes to the prior art, or all or part of the technical solution, may be embodied in the form of a software product. The computer software product is stored in a storage medium and includes instructions for causing a computer device (which may be a personal computer, server, or network device, etc.) to perform all or part of the steps of the methods described in various embodiments of the present disclosure. The above storage medium includes a U disk, a mobile hard disk, a read-only memory (ROM), a random access memory (RAM), a magnetic disk, an optical disk, or the like.

The embodiments of the present disclosure have been described in detail above, and the principles and implementations of the present disclosure are described in the specific examples. The description of the above embodiments is only used to help understand the method of the present disclosure and its core ideas. For a person skilled in the art, there will have a change in the specific embodiments and the scope of present disclosure according to the idea of the present disclosure. In summary, the content of the present specification should not be construed as limiting the present disclosure.

What is claimed is:

1. A tracking method, comprising:
    acquiring a feature point of a controller by a camera of a head-mounted display (HMD), wherein the feature point is used to indicate a corresponding location of the controller;
    receiving stale information of the controller collected by an inertial measurement unit (IMU) of the controller, wherein the state information includes position information and rotation information of the controller; and
    determining a current state of the controller according to the feature point and the state information, wherein the current state includes a current position and a current rotation of the controller;
    wherein the camera is a binocular camera, wherein the acquiring the feature point of the controller comprises:
    obtaining left and right images of the binocular camera;
    obtaining a candidate region of the images by segmenting the images and searching connected areas; and
    removing interference points of non-candidate areas of the images.

2. The method of claim 1, wherein determining the current state of the controller comprises:
    determining a first position of the controller by identifying and processing the feature point;
    determining the current position of the controller by correcting the first position with a second position collected by the IMU of the controller;
    determining the current state of the controller based on the current position and the received rotation information of the controller.

3. The method of claim 1, the method further comprising:
    prior to acquiring the feature point, synchronizing time axis and coordinate axis of the IMU of the controller and the camera of the HMD.

4. The method of claim 1, wherein the camera is a color image sensor, the feature point is a light spot, the segmenting the images comprises:
segmenting the images according to the color of the light spot.

5. The method of claim 1, wherein the camera is a black and white image sensor, the segmenting the images comprises:
segmenting the images according to a binary segmentation method.

6. The method of claim 1, wherein the method further comprising:
determining a spot is an interference point when the distance between the spot and the binocular camera exceeds a preset length value; and/or
determining a spot is an interference point when the variation of the position of the spot of current frame and the position of the spot of previous frame is out of a range; and/or
determining a spot is an interference point when the spot does not match on epipolars of the left and right images.

7. The method of claim 1, wherein the method further comprising:
determining first state information of a HMD according to an external environment image captured by the camera of the HMD, wherein the first state information including first position information and first rotation information of the HMD:
acquiring second state information of the HMD by an IMU disposed in the HMD, wherein the second state information including second position information and second rotation information of the HMD;
determining position of the HMD based on the first state information and the second information.

8. The method of claim 7, wherein the determining first state information of a HMD comprises:
capturing at least two external environment images at different moments by the camera of the HMD;
calculating a motion direction and a motion position of the HMD in duration of one frame based on the external environment;
calculating the first position information and first rotation information of the HMD according to the motion direction and the motion position.

9. The method of claim 7, wherein the method further comprising: synchronizing time axis and coordinate axis of the IMU of the HMD and the camera of the HMD.

10. A tracking system, comprising a head-mounted display (HMD) and at least one controller; wherein the HMD comprises:
a camera, configured to capture a feature point of the controller, wherein the feature point is used to indicate a corresponding location of the controller;
a transceiver, configured to receive state information collected by an inertial measurement unit (IMU) of the controller; and
a processor, configured to determine a current state of the controller according to the feature point and the state information, wherein the current state includes a current position and a current rotation of the controller;
the controller comprises: a light spot, configured for representing the feature point on an image captured by the camera;
an IMU, configured to collect the state information including position information and rotation information of the controller; and a transceiver processing unit, configured to send the state information to the HMD;
wherein the camera is a binocular camera, wherein the processor is further configured for:
obtaining left and right images of the binocular camera;
obtaining a candidate region of the images by segmenting the images and searching connected areas; and
removing interference points of non-candidate areas of the images.

11. The system of the claim 10, wherein the processor is further configured for: determining a first position of the controller by identifying and processing the feature point; determining the current position of the controller by correcting the first position with a second position collected by the IMU of the controller; determining the current state of the controller based on the current position and the rotation information collected by the IMU of the controller.

12. The system of the claim 10, wherein the HMD further comprises an IMU configured to collect state information including position information and rotation information of the HMD; the processor is further configured for: determining first state information of a HMD according to an external environment image captured by the camera of the HMD, wherein the first state information including first position information and first rotation information of the HMD; acquiring second state information of the HMD by the IMU disposed in the HMD, wherein the second state information including second position information and second rotation information of the HMD; determining position of the HMD based on the first state information and the second information.

13. The system of the claim 12, wherein the camera is further configured to capture at least two external environment images at different moments; the processor is further configured to calculate a motion direction and a motion position of the HMD in duration of one frame based on the external environment, and calculate the first position information and first rotation information of the HMD according to the motion direction and the motion position.

14. A HMD, comprising:
a camera, configured to capture a feature point of the controller, wherein the feature point is used to indicate a corresponding location of the controller;
a transceiver, configured to receive state information collected by an IMU of the controller, wherein the state information includes position information and rotation information of the controller; and
a processor, configured to determine a current state of the controller according to the feature point and the state information, wherein the current state includes a current position and a current rotation of the controller;
wherein the HMD further comprises an IMU configured to collect state information including position information and rotation information of the HMD;
the processor is further configured for:
determining first state information of a HMD according to an external environment image captured by the camera of the HMD, wherein the first state information including first position information and first rotation information of the HMD;
acquiring second state information of the HMD by the IMU disposed in the HMD, wherein the second state information including second position information and second rotation information of the HMD;
determining position of the HMD based on the first state information and the second state information.

15. The HMD of the claim 14, wherein the processor is further configured for: determining a first position of the controller by identifying and processing the feature point; determining the current position of the controller by correcting the first position with a second position collected by the IMU of the controller; determining the current state of the controller based on the current position and the rotation information collected by the IMU of the controller.

16. The HMD of the claim 14 wherein the camera is further configured to capture at least two external environment images at different moments; the processor is further configured to calculate a motion direction and a motion position of the HMD in duration of one frame based on the external environment, and calculate the first position information and first rotation information of the HV1 D according to the motion direction and the motion position.

* * * * *